US006560916B1

(12) United States Patent
Maxim (10) Patent No.: US 6,560,916 B1
(45) Date of Patent: May 13, 2003

(54) TORSION FISHING HOOK APPARATUS WITH QUICK, HARMLESS EXTRACTION AND SAFE LATCHING FEATURES

(76) Inventor: John G. Maxim, 863 Coventry St., Boca Raton, FL (US) 33487

( * ) Notice: Subject to any disclaimer, the term of this patent is extended or adjusted under 35 U.S.C. 154(b) by 0 days.

(21) Appl. No.: 09/792,099

(22) Filed: Feb. 23, 2001

(51) Int. Cl.[7] ............................................. A01K 83/00
(52) U.S. Cl. ................................. 43/43.16; 43/44.83
(58) Field of Search .................... 43/43.16, 44.83, 43/43.2, 43.4, 43.6, 34, 36, 37

(56) References Cited

U.S. PATENT DOCUMENTS

| | | | | |
|---|---|---|---|---|
| 2,274,131 A | * | 2/1942 | Edberg | 43/44.83 |
| 2,501,210 A | * | 3/1950 | Cretin | 43/43.16 |
| 2,979,852 A | * | 4/1961 | Schinke et al. | 43/43.16 |
| 3,082,563 A | * | 3/1963 | Mason | 43/43.16 |
| 3,397,477 A | * | 8/1968 | Hand | 43/34 |
| 3,724,116 A | * | 4/1973 | Lindner et al. | 43/44.83 |
| 3,811,217 A | * | 5/1974 | Watkins | 43/43.4 |
| 3,890,735 A | * | 6/1975 | Serrill | 43/36 |
| 4,126,957 A | * | 11/1978 | Randall | 43/43.16 |
| 4,476,646 A | * | 10/1984 | Weiman | 43/34 |
| 4,841,666 A | * | 6/1989 | Dallas | 43/43.16 |
| 5,195,268 A | * | 3/1993 | Ellis et al. | 43/37 |
| 5,279,067 A | * | 1/1994 | Tollison | 43/44.83 |
| 5,491,925 A | * | 2/1996 | Carpenter | 43/36 |
| 5,901,493 A | * | 5/1999 | Tolliver | 43/43.16 |
| 5,946,846 A | * | 9/1999 | Cotton | 43/36 |
| 6,334,273 B2 | * | 1/2002 | Turner et al. | 43/44.83 |

FOREIGN PATENT DOCUMENTS

| | | | | |
|---|---|---|---|---|
| CA | 778079 B1 | * | 2/1968 | 43/43.16 |
| CH | 480006 B1 | * | 12/1969 | 43/43.16 |
| JP | 8-131024 B1 | * | 5/1996 | |
| JP | 10-295200 B1 | * | 11/1998 | |
| JP | 11-113447 B1 | * | 4/1999 | |
| JP | 2001-95427 B1 | * | 4/2001 | |
| WO | WO 97/49280 B1 | * | 12/1997 | |

* cited by examiner

Primary Examiner—Darren W. Ark
(74) Attorney, Agent, or Firm—Oltman, Flynn & Kubler (57) ABSTRACT

A fishing hook apparatus includes a resilient shaft including a shank segment which is substantially rectilinear and having a shank segment proximal end and a shank segment distal end and including a hook segment which is substantially rectilinear and having a hook segment connected end joined to the shank segment proximal end, the hook segment being extendable from the shank segment at an acute angle relative to the shank segment generally back toward the shank segment proximal end and outwardly from the shank segment and terminating in a hook point; a line engaging structure including at least one shaft loop formed in the shank segment proximal end by doubling a terminal length of the shaft back along the shank segment proximal end toward the shank segment distal end and then angling away from the shank segment to freely receive a strand of fishing line between the adjacent portions of the shank segment.

3 Claims, 7 Drawing Sheets

TORSION FISHING HOOK APPARATUS WITH QUICK, HARMLESS EXTRACTION AND SAFE LATCHING FEATURES

BACKGROUND OF THE INVENTION

1. Field of the Invention

The present invention relates generally to the field of fishing equipment. More specifically the present invention relates to a fishing hook apparatus having several improvements in configuration over conventional hooks, with multiple embodiments providing more reliable line engagement, greater speed and ease of line attachment and removal, more reliable fish engagement, minimal injury fish disengagement for healthy fish release, hook point repositioning into a safe storage mode and an optional coiled middle segment defining a fishing lure which retains chum and visual accessories.

The body of the apparatus is a metal shaft configured to define a shank segment with a proximal end and distal end, and a hook segment joined to the shank segment proximal end. The hook segment extends at an acute angle with respect to the shank segment and terminates in a hook point and at least one and preferably two barbs on the hook segment point toward the shank segment and distally. As a result of this configuration, a fish engaged on the hook apparatus is pulled more deeply into the hook segment when the fishing line is in tension causing the hook segment to resiliently pivot away from the shank segment against its resilience so that the hook apparatus opens further, and the hook segment resiliently pivots back toward the shank segment when the fishing line is slack so that the hook apparatus closes around the engaged portion of the mouth of the fish and the barbs are driven into firmer engagement of the fish. As a result, a fish becomes more securely engaged as it fights.

All embodiments of the invention preferably include a quick wrap fishing line engaging structure. The shank segment proximal end is bent into a loop and the remaining terminal length of the shaft extends parallel to and along the shank segment toward the shank segment distal end, and then angles away from the shank segment to more readily receive a loop of fishing line. A fishing line is passed through the loop and wrapped around shank portion and the terminal length of the shaft, and then fitted between the shank portion and the terminal length of the shaft. As a result of this tying, tension in the fishing line causes the line to pull the shank segment and terminal length of the shaft together, to more tightly engage the portion of the line pinched between the shank segment and the terminal length of the shaft.

A spiraled sliding wire which is permanently wrapped into a first coil and a second coil in a diameter to closely and slidingly fit around shank segment, the first and second coils being interconnected by a length of the wire. A third coil is provided beyond second coil and wraps around shank segment with a sufficient clearance to additionally receive the hook segment. A shank segment loop is provided in the shank segment distal end and a hook segment loop is provided in the hook segment connected end which passes through and interlinks with the shank segment loop. A hook segment locking segment extends beyond the hook segment loop and is pivotable into a position parallel with and adjacent to the shank segment. The functions of the sliding wire are analogous to those of the sliding tube. The hook segment is pivoted so that the hook segment locking segment is adjacent to the shank segment and the sliding wire is slid along the shank segment so that the third coil encircles the locking segment. As a result, the locking segment is retained in its position adjacent to the shank-segment, and the hook segment is consequentially oriented in its angled, deployed fish engaging position. Then the sliding wire can be slid proximally along the shank segment to release the locking segment, and the hook segment may be swung freely so that the point of the hook segment is pointed distally to release the fish with minimal damage to the fish. This is particularly important where an undersized fish is caught and must be released, or the object of the fishing is to catch only and not to keep the fish, and the fish can be released without mortal wounds. Finally the hook segment can be pivoted so that the hook point is pointed proximally and the sliding wire can be slid so that the third coil is positioned around the hook segment for safe storage. This third mode prevents the hook point from pivoting away from the shank segment, so that no one is injured by it when the apparatus is not in use.

2. Description of the Prior Art

There have long been fishing hooks configured for tying onto the free end of fishing line and for mounting bait and for engaging fish taking the bait. These prior hooks have seemingly always had the configuration of a U-shape, with one leg of the U longer and having a line engaging eyelet at its upper end and the other leg of the U terminating in a point and most often a barb. A problem with these prior hooks has been that they tend to slide, rock and pivot continually once a fish is engaged, causing the hook eyelet as well as the U portion to widen, and the hook therefore to become dislodged from the fish and sometimes from the line. Another problem has been that these prior hooks are difficult to store, because they are a safety hazard and also become tangled easily. Yet another problem is that they often require use of a separate lure.

It is thus an object of the present invention to provide a fishing hook apparatus having a configuration which causes the apparatus to anchor itself into the fish more securely than a conventionally shaped hook, and which can release the fish virtually unharmed.

It is another object of the present invention to provide such an apparatus which has a configuration which is more securely engaged by the fishing line and yet is easily mounted to and dismounted from the fishing line.

It is still another object of the present invention to provide such an apparatus which optionally includes a middle segment formed of the fishing hook shaft which spirals to create the structure of a fishing lure, so that no separate lure is required, and which retains chum and visual accessories such as streamers, eyes and fins.

It is finally an object of the present invention to provide such an apparatus which includes a torsion feature assisting in preventing a fish from "spitting" the hook out or otherwise dislodging the hook when the line is slack, which is durable and reliable and which is relatively inexpensive to manufacture.

SUMMARY OF THE INVENTION

The present invention accomplishes the above-stated objectives, as well as others, as may be determined by a fair reading and interpretation of the entire specification.

A fishing hook apparatus is provided, including a resilient shaft including a shank segment which is substantially rectilinear and having a shank segment proximal end and a shank segment distal end and including a hook segment which is substantially rectilinear and having a hook segment connected end joined to the shank segment proximal end, the hook segment being extendable from the shank segment at an acute angle relative to the shank segment generally back toward the shank segment proximal end and outwardly from the shank segment and terminating in a hook point; a line engaging structure including at least one shaft loop formed in the shank segment proximal end by doubling a terminal length of the shaft back along the shank segment proximal end toward the shank segment distal end and then angling away from the shank segment to freely receive a strand of fishing line between the adjacent portions of the shank segment.

The shank segment and the hook segment preferably are interconnected by a shank segment loop in the shank segment distal end and a hook segment loop in the hook segment connected end passing through and interlinked with shank segment loop, including a spiraled sliding wire permanently wrapped into a first coil and a second coil in a diameter to closely and slidingly fit around the shank segment, the first and second coils being interconnected by a length of the wire; a third coil distal of the second coil and wrapping around the shank segment with a sufficient clearance to additionally receive the hook segment; a hook segment locking segment extending beyond the hook segment loop and pivotable into a position parallel with and adjacent to the shank segment; where the hook segment is pivotable to a position adjacent to the shank segment so that the sliding wire can be slid along the shank segment until the third coil encircles the locking segment, thereby retaining the locking segment in its position adjacent to the shank segment and the hook segment is oriented in its angled, deployed fish engaging position; and where the sliding wire can be slid proximally along the shank segment to release the locking segment, and the hook segment then can be swung freely so that the hook segment is pointed distally to release the fish with minimal damage to the fish, and where the hook segment can be pivoted so that the hook segment is pointed proximally and then the sliding wire can be slid so that the third coil is positioned around the hook segment for safe storage, preventing the hook point from pivoting away from the shank segment.

The shank segment and the hook segment are alternatively interconnected by a pivot pin passing through pin ports in the shank segment distal end and the hook segment connected end, and the apparatus preferably additionally includes a sliding tube surrounding a portion of the shank segment; a shank segment engaging mechanism releasibly securing the shank segment at one of a certain first axial position and a second axial position, the sliding tube having a tube distal end cut at an angle other than ninety degrees relative to the axis of the shank segment, permitting the hook segment to pivot back generally toward the apparatus proximal end and away from the shank segment to define an acute angle with the shank segment and a protruding tube edge, the sliding tube including a tube abutment segment extending from the protruding tube edge to define a pivot stop surface, and the hook segment has a hook segment connected end which preferably is cut at an angle and the pivot stop surface passes adjacent to and against the hook segment connected end when the hook segment is in its angled position, preventing the hook segment from pivoting relative to the shank segment; so that the hook segment can be braced at a fish engaging angle relative to the shank segment by the tube abutment segment for engaging a fish; and so that the sliding tube can be slid proximally along the shank segment to release the hook segment so that the hook segment pivots freely, to release a fish with minimal injury; and so that the hook segment can be locked in a distally extended position by the tube abutment segment.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1–18, a fishing hook apparatus 10 is disclosed including a quick wrap fishing line engaging structure 20. The body of apparatus 10 is a metal shaft 12 configured to define a shank segment 14 with a shank segment proximal end 14a and shank segment distal end 14b, and a hook segment 16 joined to shank segment proximal end 14a.

All embodiments of the invention preferably include a quick wrap fishing line engaging structure. FIGS. 1–3 and 7 show the preferred single eye or loop line engaging structure 30. The shank segment proximal end 14a is bent into a loop 32 and remaining terminal length 12a of the shaft 12 extends parallel to and along the shank segment 14 toward the shank segment distal end 14b, and then angling away from the shank segment 14 to more readily receive a loop of fishing line L. A fishing line L is passed through the loop 32 and wrapped around shank portion 14 and the terminal length 12a of the shaft, and then fitted between the shank portion 14 and the terminal length 12a of the shaft. See FIG. 7. As a result of this tying, tension in the fishing line L causes the line L to pull the shank segment 14 and terminal length 12a of the shaft together, to more tightly engage the portion of the line L pinched between the shank segment 14 and the terminal length 12a of the shaft.

The line engaging structure 20 alternatively takes the form of a double loop formed in the shank segment proximal end 14a. The shank segment 14 is bent into a first loop 22 with a length of the shaft 12 protruding laterally from the shank segment 14 which is bent into a second loop 24 laterally adjacent to the first loop 22, with the remaining terminal length 12a of the shaft 12 extending parallel to and along the shank segment 14 toward the shank segment distal end 14b, and then angling away from the shank segment 14 to more readily receive a loop of fishing line L. See FIGS. 1, 2, 3, 11 and 12. One side of a loop of fishing line L is fitted between the shank segment 14 and the terminal length of the shaft 12a, around the second loop 24 and into the first loop 22. This fishing line engaging structure 20 permits the line L to be passed through the first and second loops 22 and 24, respectively, and wrapped around the shank segment 14 and terminal length 12a of shaft 12 so that the fishing line is squeezed when tension is applied.

A spiraled sliding wire 26 which is permanently wrapped into a first coil 28 and a second coil 34 in a diameter to closely and slidingly fit around shank segment 14, the first and second coils 28 and 34 being interconnected by a length of the wire 26. See FIGS. 1–3. A third coil 36 is provided beyond second coil 34 and wraps around shank segment 14 with a sufficient clearance to additionally receive hook segment 16. A shank segment loop 38 is provided in the shank segment distal end 14b and a hook segment loop 48 is provided in the hook segment connected end 16a which passes through and interlinks with shank segment loop 38. A hook segment locking segment 18 extends beyond the hook segment loop 38 and is pivotable into a position parallel with and adjacent to the shank segment 14. The functions of the sliding wire 102 are analogous to those of the sliding tube 74. The hook segment 16 is pivoted so that the hook segment locking segment 18 is adjacent to the shank segment 14 and the sliding wire 26 is slid along shank segment 14 so that the third coil 36 encircles the locking segment 18. As a result, locking segment 18 is retained in its position adjacent to the shank segment 14, and the hook segment 16 is consequentially oriented in its angled, deployed fish engaging position. See FIG. 1. Then sliding wire 26 can be slid proximally along shank segment 14 to release locking segment 18, and hook segment 16 may be swung freely so that the point of hook segment 16 is pointed distally to release the fish with minimal damage to the fish. See FIG. 2. This is once again particularly important where an undersized fish is caught and must be released, or the object of the fishing is to catch only and not to keep the fish, and the fish can be released without mortal wounds. Finally the hook segment 16 can be pivoted so that the hook point is pointed proximally and the sliding wire 26 can be slid so that the third coil 36 is positioned around the hook segment 16 for safe storage. See FIG. 3. This third mode prevents the hook point from pivoting away from the shank segment 14, so that no one is injured by it when apparatus 10 is not in use.

Several embodiments of fishing hook apparatus 10 preferably also include a wedge hook structure 40, where the shank segment distal end 14b terminates in a biasing pivot coil 42 where the shaft 12 is wrapped into tight and laterally abutting resilient coil loops, and then the shaft 12 extends from the biasing pivot coil 42 generally back toward the shank segment proximal end 14a and outwardly from the shank segment 14 to define the hook segment 16 at an acute angle with the shank segment 14 and terminating in a hook point and at least one and preferably two barbs 44 pointing toward the shank segment 14 and distally toward the biasing pivot coil 42. A third barb 46 is preferably provided in the shank segment 14 pointing toward the hook segment 16 and distally toward the biasing pivot coil 42. As a result of this configuration, a fish engaged on hook apparatus 10 is pulled more deeply onto the hook segment 16 and toward the biasing pivot coil 42 when the fishing line L is in tension, causing the hook segment 16 to resiliently pivot away from the shank segment 14 against the biasing of the biasing pivot coil 42 so that the hook apparatus 10 opens further. The hook segment 16 resiliently pivots back toward the shank segment 14 when the fishing line L is slack so that the hook apparatus 10 closes around the engaged portion of the mouth of the fish and the barbs 44 and 46 are driven into firmer engagement of the fish. As a result, a fish becomes more securely engaged as it fights. The single loop line engaging structure 30 is suited to interconnecting second apparatus 10 in series in a configuration called ganging, for hooking larger fish. See FIG. 8. One hook loop structure 30 is passed through the next adjacent biasing pivot coil 42.

A safety storage hook seat 52 is preferably provided in the shank segment 14 for receiving the hook segment 16 when the hook apparatus 10 is not in use, for safe handling and storage. The hook segment 16 can be pivoted almost parallel to the shank segment 14 and past the hook seat 52, and then swung over the hook seat 52 and pivoted back into the hook seat 52 with the biasing of the biasing pivot coil 42, which removably holds the hook segment 16 in the hook seat 52. The hook seat 52 is preferably a laterally extending U-shaped portion of the shank segment 14 having two U-shaped portion legs interconnected by a U-shaped portion link, and the two U-shaped portion legs are both bent into a curve wrapping partially around the axis of the shank segment 14 to form a seat shape in which the hook segment 16 can rest.

Another optional feature is a lure portion 60 formed by coiling a length of the shank segment 14 in progressively wider coils and then in progressively narrower coils 62. See FIG. 9. This configuration gives the appearance of a lure so that no separate lure is necessary, and permits retention of pieces of chum either by pulling adjacent coils 62 apart against their resilience and inserting chum pieces into the internal cavity of the lure portion 60 or simply inserting them between the coils 62. Visual effects such as streamers 64, lure eyes 68 and fins may be inserted and resiliently retained between adjacent coils as well. Eyes 68 are preferably provided as a flat shaft for gripping between adjacent coils 62 and having a convex head at each end protruding outside coils 62 to each represent an eye 68 on each side of lure portion 60.

Second Preferred Embodiment

In another embodiment of hook apparatus 10, the biasing pivot coil 42 is replaced by a pivot pin 72 or screw pivotally interconnecting the shank segment 14 and the hook segment 16. A biased sliding tube 74 surrounds part of the shank segment 14 and is biased with a coil tube spring 76 and extends between the fishing line engaging structure 20 and the sliding tube 74. FIGS. 10–16. Sliding tube 74 has a tube proximal end 74a flared into a radial abutment flange against which the tube spring 76 bears and has a tube distal end 74b which is cut at an angle relative to the axis of the sliding tube 74, permitting the hook segment 16 to pivot back generally toward the apparatus 10 proximal end and away from the shank segment 14 to define an acute angle with the shank segment 14, as described for the first embodiment. A tube abutment segment 78 extends from the protruding edge of the tube segment distal end 74b to define a pivot stop surface S. The hook segment 16 has a hook segment connected end 16a which is cut at an angle and the pivot stop surface S passes adjacent to and against the hook segment connected end 16a when the hook segment 16 is in its angled position, preventing the hook segment 16 from pivoting relative to the shank segment 14. See FIG. 12. When hook apparatus 10 is to be stored, the sliding tube 74 is pulled toward the apparatus 10 proximal end against the biasing of the tube spring 76, moving the tube abutment segment 78 and its pivot stop surface S away from the hook segment 16 connected end, thereby quickly releasing and freeing the hook segment 16 to pivot. See FIG. 13. The hook segment 16 then may be pivoted toward the apparatus 10 proximal end to extend along and substantially parallel with the shank segment 16. See FIG. 10. Then the sliding tube 74 is permitted to slide along the shank segment 14 and over the hook segment 16, thereby entirely covering the hook segment 16 point for complete safety and barbs 44 and 46 and preventing the hook segment 16 from pivoting outwardly. Finally, the sliding tube 74 can be pulled back toward the apparatus 10 proximal end to uncover and release the hook segment 16, and the hook segment 16 can be pivoted away from the apparatus 10 proximal end to become substantially co-axial with shank segment 14 and to pivot freely. See FIG. 13. In this configuration, the angled hook segment connected end abuts the shank segment distal end which is correspondingly angled to cause the hook segment to rest and freely pivot to a coaxial orientation relative to the shank segment 14. This latter configuration is suitable for quick and easy removal of the fish from the hook apparatus 10, with less harm to the fish. This is particularly important where an undersized fish is caught and must be released, or the object of the fishing is to catch only and not to keep the fish, and the fish can be released without mortal wounds. Hook segment 16 can also be locked in a coaxial, straight needle orientation by tube abutment segment 78 for threading the line L through the gills and mouth of the fish for holding or carrying, or for leaving the fish within the water wherein it remains alive without harm, so that a fish well is not needed on the boat or dock for this purpose.

An alternative to tube spring 76 is a series of circumferential shank segment ribs 92 which are engaged by an engaging protrusion 94 mounted on a resilient leaf section 96 of sliding tube 74 which is biased inwardly within a sliding tube port 98. As shank segment 14 is slid within sliding tube 74, engaging protrusion 94 rides over one of the ribs 92 and nestles between adjacent ribs 92, resisting further axial movement of shank segment 14 within sliding tube 74. Two spaced apart pairs of ribs 92 are preferably provided to permit retention of shank segment 14 in two axial positions, corresponding to the hook segment 16 angled deployed mode and the hook segment 16 fully extended mode. See FIG. 16.

Figure 1:
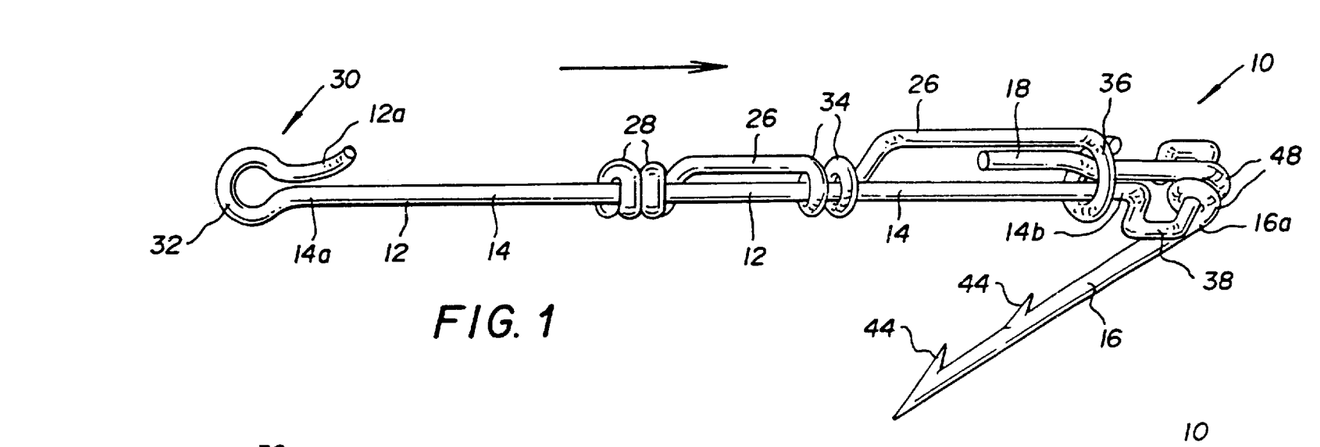
FIG. 1 is side view of the sliding wire variation of the second embodiment, showing the hook segment locked in the fish engaging position.
Figure 2:
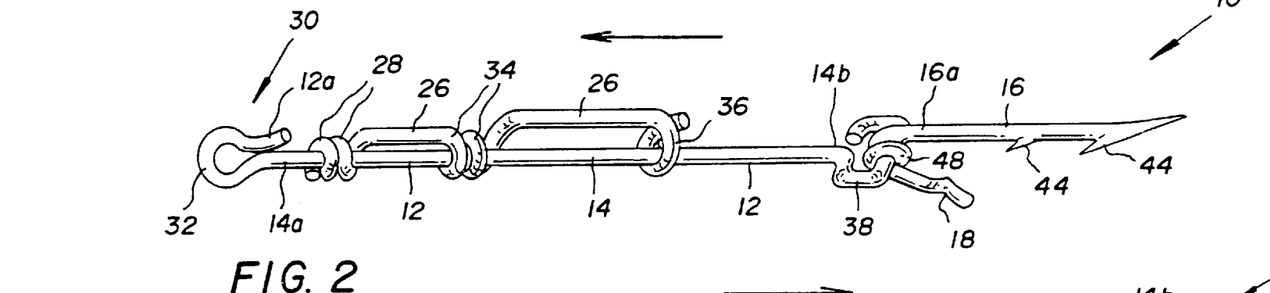
FIG. 2 is a view as in FIG. 1 with the hook segment pivoting freely for fish release with minimal injury.
Figure 3:
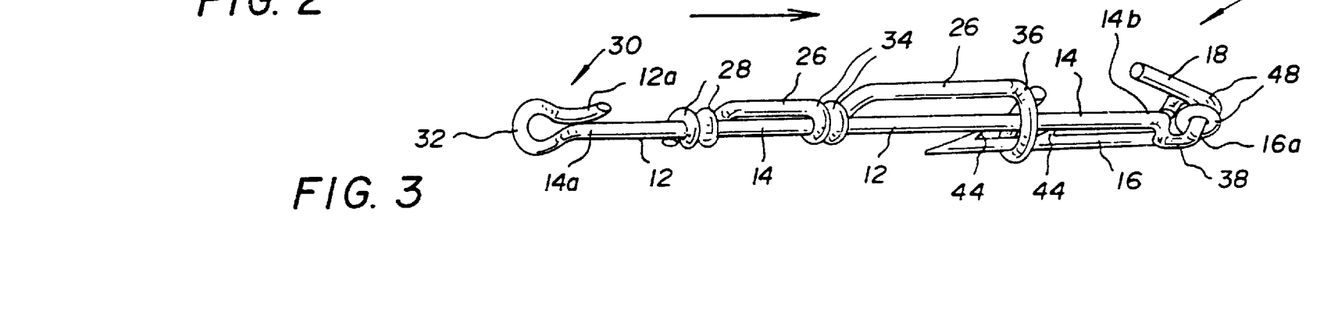
FIG. 3 is a view as in FIG. 1 with the hook segment locked against the shank segment for safe handling of the apparatus.
Figures 4, 5:
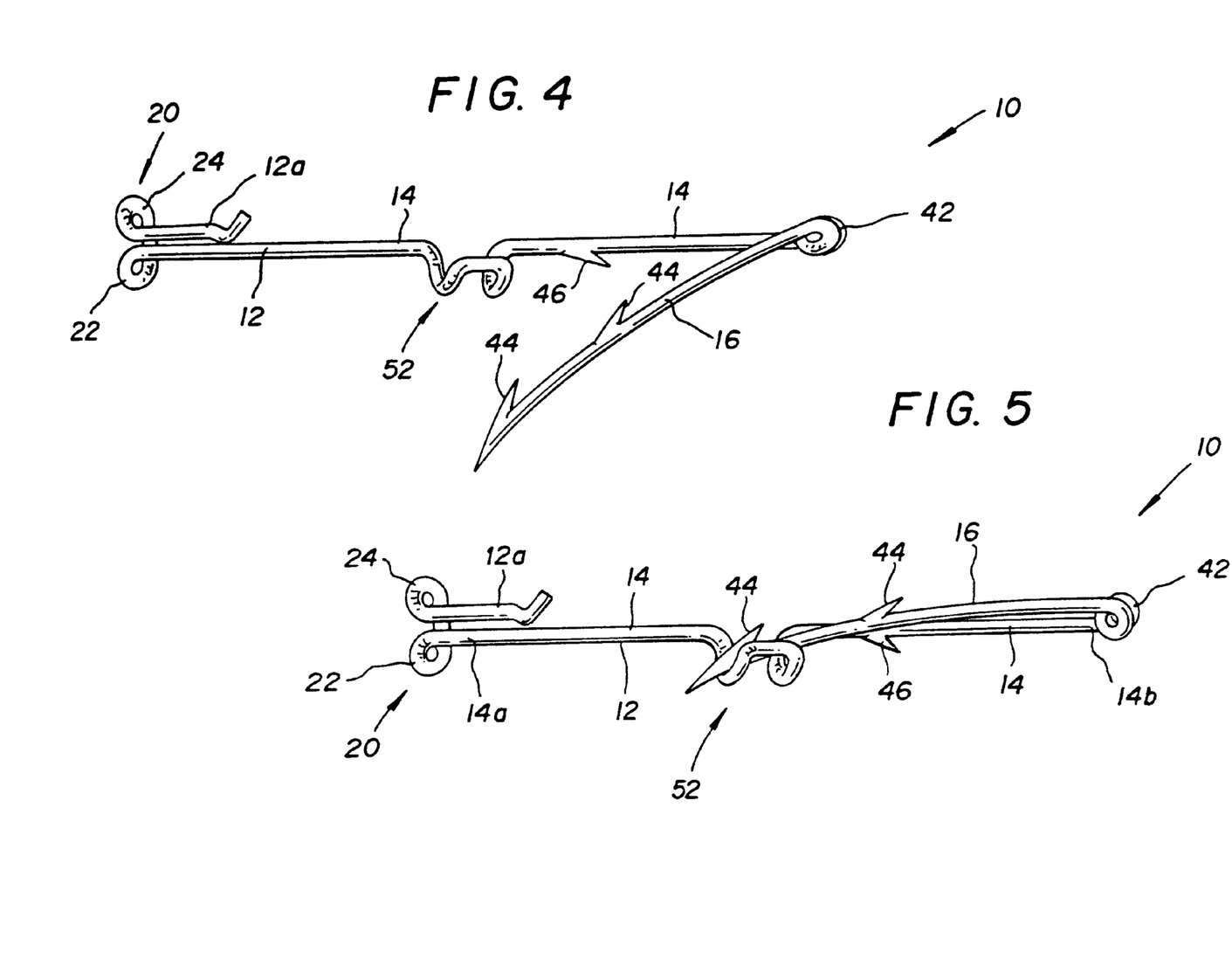
FIG. 4 is a side view of the first embodiment of the apparatus with the hook segment deployed in its protruding position to engage a fish.
FIG. 5 is a side view of the embodiment of FIG. 4, showing the hook segment pivoted against the biasing of the biasing pivot coil into its safe storage position adjacent to and substantially parallel with the shank segment, and held in this position by the hook seat.
Figures 6, 7:
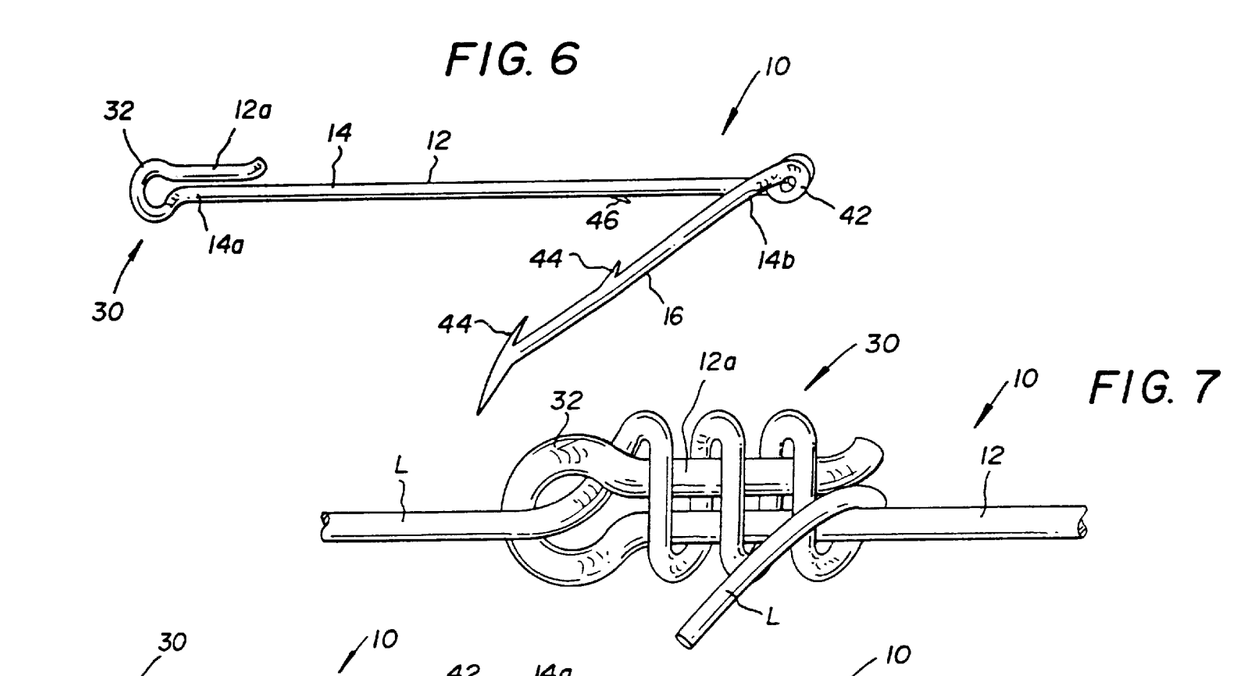
FIG. 6 is a side view of the embodiment shown in FIG. 4, except that the two loop line engaging structure is replaced with a single loop line engaging structure.
FIG. 7 is a broken away side view of the single loop line engaging structure shown in FIG. 6, with a fishing line tied around the loop line engaging structure as disclosed.
Figure 8:
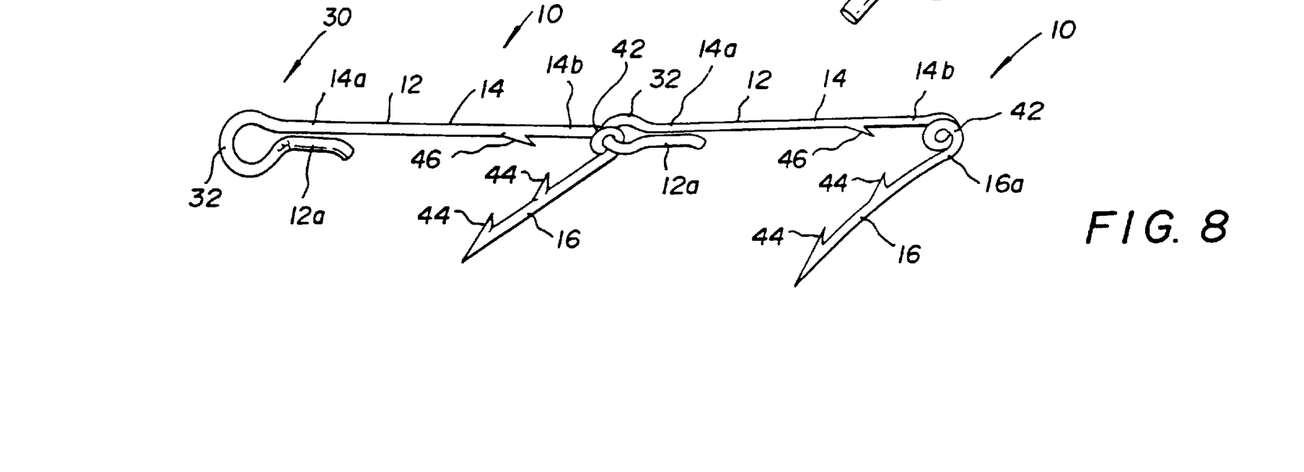
FIG. 8 is a side view of two of the hook apparatus joined end to end in the ganging arrangement.
Figure 9:
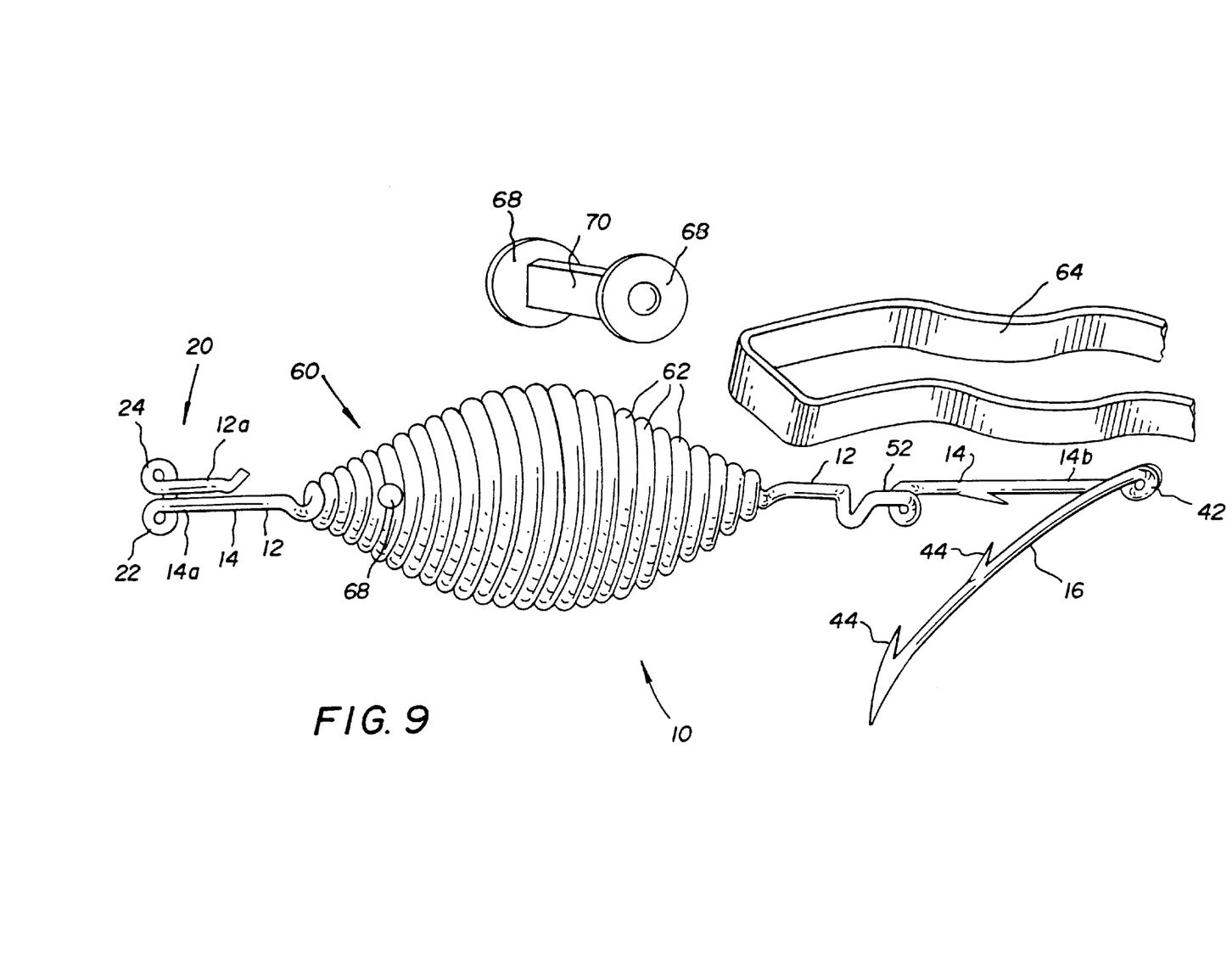
FIG. 9 is a side view of the apparatus of FIG. 4 with the optional lure coil segment, and a lure eye assembly and streamer.
Figures 10, 11, 12, 13:
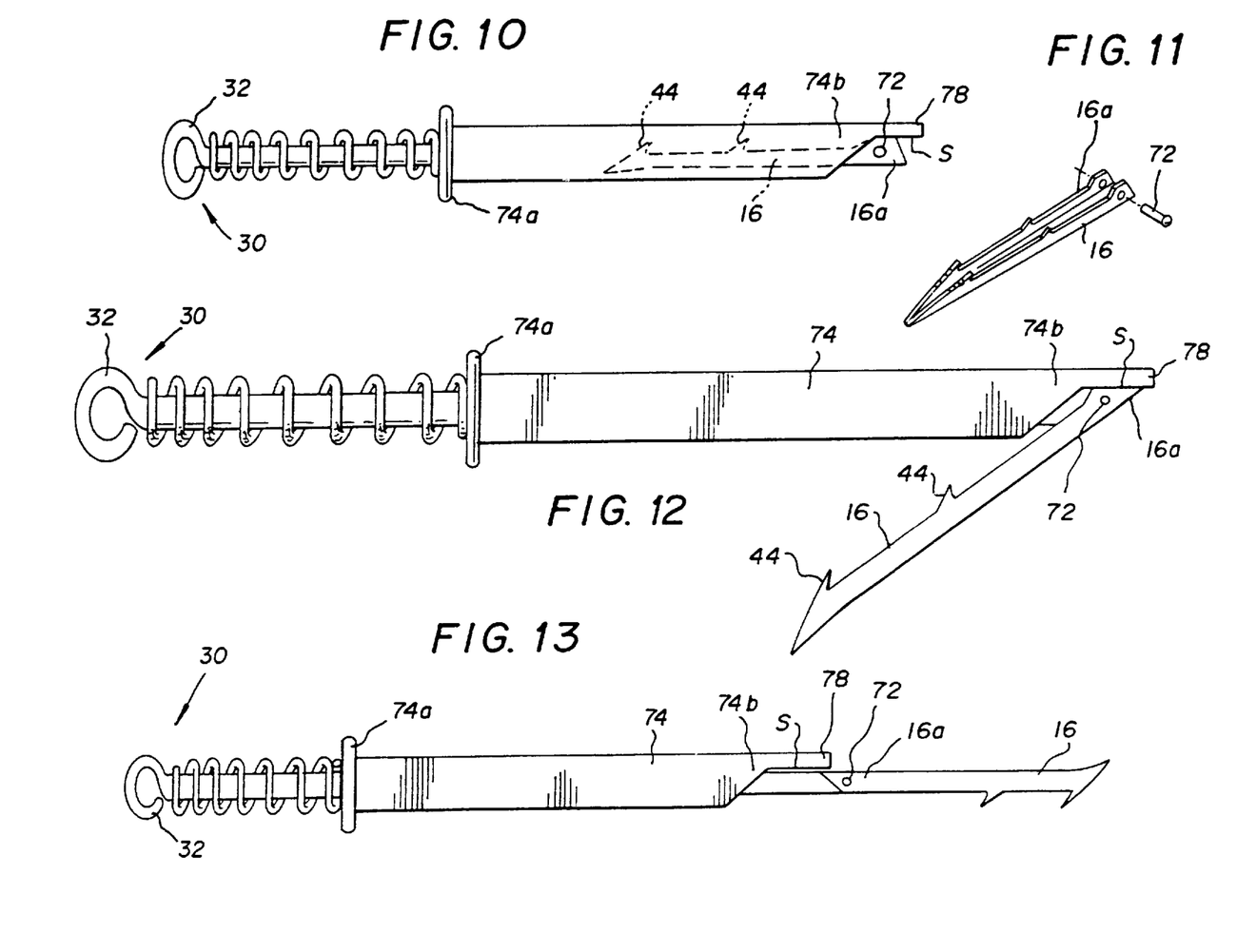
FIG. 10 is a side view of the second embodiment of the apparatus having the sliding tube, with the hook segment removed.
FIG. 11 is a side view of the preferred hook segment for attachment to the apparatus of FIG. 10.
FIG. 12 is a side view of the embodiment of FIG. 10 with the hook segment locked in its deployed, fish engaging position.
FIG. 13 is a side view as in FIG. 12 with the hook segment released to pivot freely by application of a force pulling the sliding tube against the biasing of the tube spring, minimal damage release of a fish.
Figure 14:
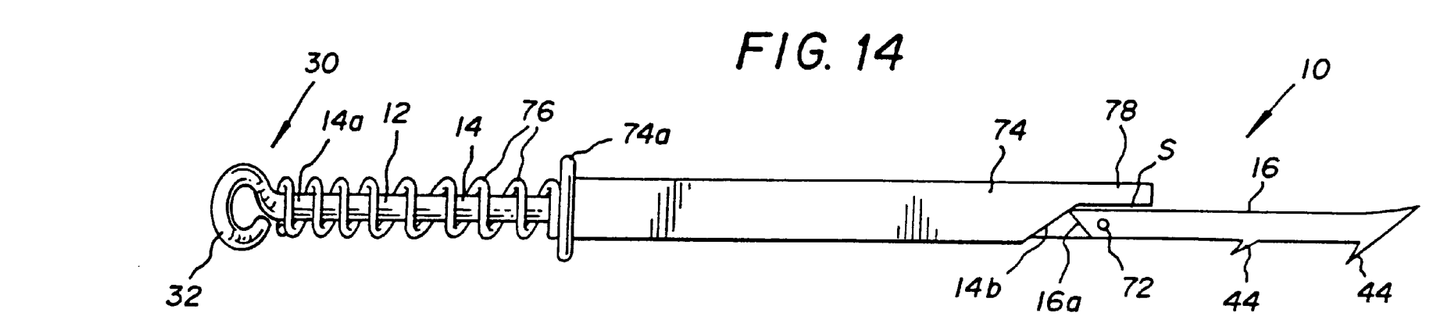
FIG. 14 is a view as in FIG. 13 with the sliding tube released so that the biasing of the tube spring places the sliding tube abutment segment adjacent the hook segment, locking the hook segment in its distally extended position co-axial with the shank segment.
Figure 15:
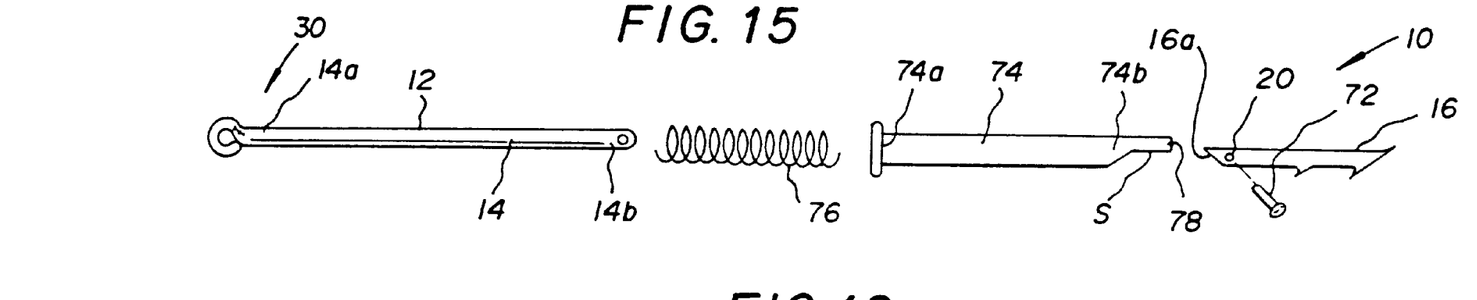
FIG. 15 is an exploded view of the apparatus of FIGS. 10–14.
Figure 16:
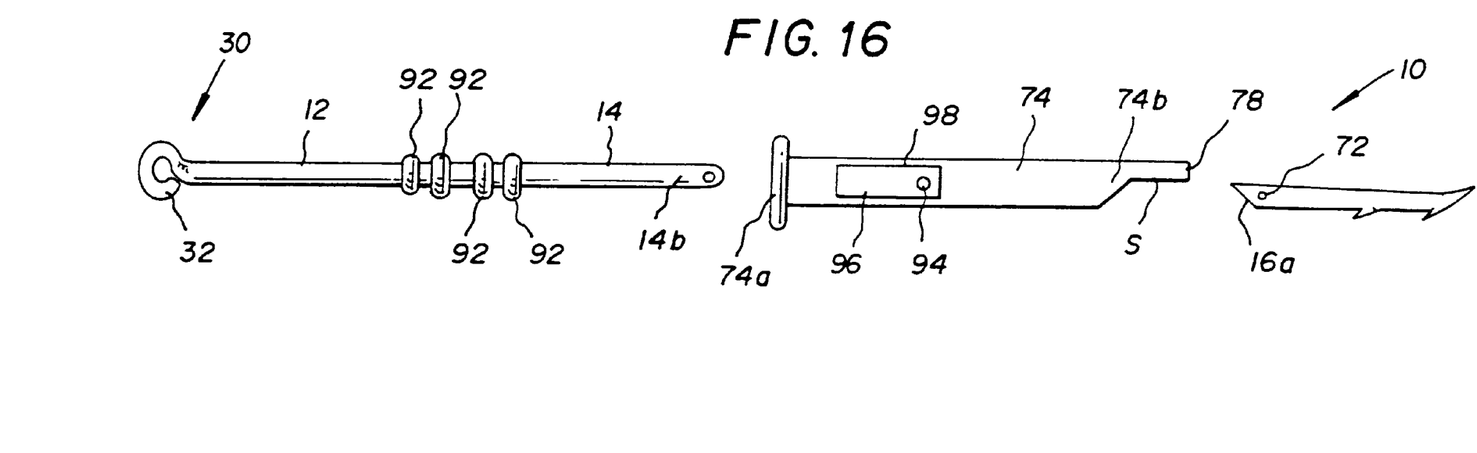
FIG. 16 is an exploded view of the apparatus of FIG. 15, with the addition of shank segment latching ribs.
Figures 17, 18:
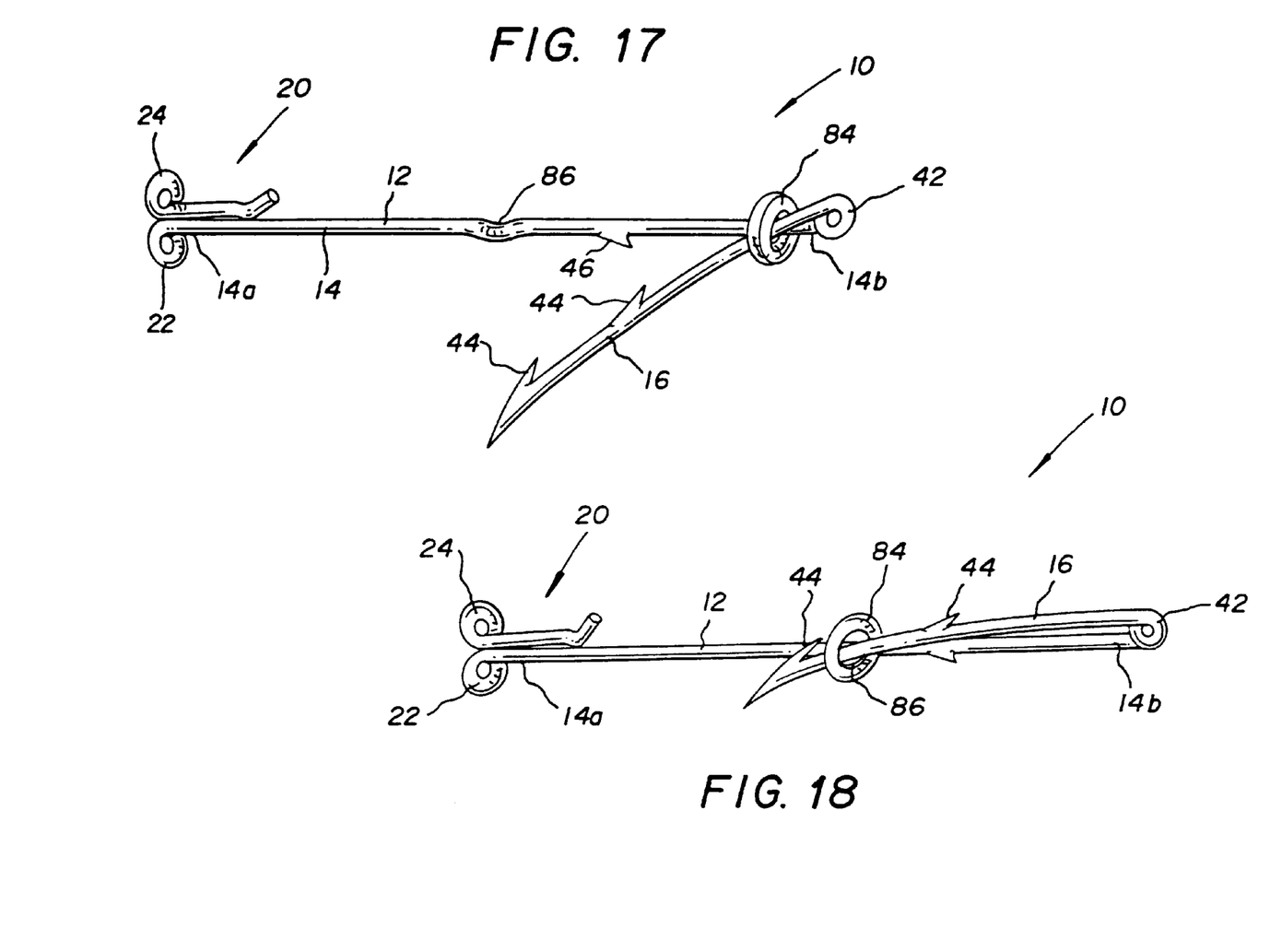
FIG. 17 is a side view of the sliding collar version of the second embodiment, showing the sliding collar positioned to release the hook segment to spring outwardly into its deployed position.
FIG. 18 is a side view as in FIG. 17, with the sliding collar slid proximally so that it retains the hook segment adjacent to and substantially parallel with the shank segment, so that the point of the hook segment safely retracted and does not injure anyone when the apparatus is not in use.

A variation of sliding tube 74 and sliding wire 26 is a sliding collar 84 used to retain the hook segment 16 closely adjacent to the shank segment 14 against the biasing of the biasing pivot coil 42, for apparatus 10 handling and storage. A jog or detent 86 is used for securing collar 84 and holding the hook segment 16 in this storage position. See FIG. 18. FIG. 17 shows the hook apparatus 10 with sliding collar 84 moved into close proximity with biasing pivot coil 42, so that hook segment 16 is freed and pivots with the biasing of biasing pivot coil 42 into a deployed, acute angle relative to shank segment 14, so that apparatus 10 is ready for use.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A fishing hook apparatus, comprising:
   a resilient shaft comprising a shank segment which is substantially rectilinear and having a shank segment proximal end and a shank segment distal end and comprising a hook segment which is substantially rectilinear and having a hook segment connected end joined to the shank segment distal end, said hook segment being extendable from said shank segment at an acute angle relative to said shank segment generally back toward said shank segment proximal end and outwardly from said shank segment and terminating in a hook point;
   a line engaging structure at said shank segment proximal end for receiving and engaging a strand of fishing line;
   wherein said shank segment and said hook segment are interconnected by a hook segment pivot means at the shank segment distal end and at the hook segment connected end,
   a hook segment locking segment extending from said hook segment connected end beyond said hook segment pivot means and pivotable into a position parallel with and adjacent to said shank segment;

and a sliding annular member slidingly fitting around said shank segment with a sufficient clearance to receive said hook segment locking segment in addition to said shank segment, and slidingly fitting around said shank segment with sufficient clearance to receive said hook segment in addition to said shank segment;

wherein said hook segment locking segment is pivotable to a position adjacent to said shank segment such that said sliding annular member can be slid along said shank segment until said sliding annular member encircles said hook segment locking segment, thereby retaining said hook segment locking segment in its position adjacent to said shank segment and said hook segment is oriented in an angled, deployed fish engaging position; and wherein said sliding annular member can be slid proximally along said shank segment to release said locking segment, and then said hook segment can be pivoted to a position in which said hook segment is pointed distally to release the fish with minimal damage to the fish, and said hook segment can be pivoted to a position in which said hook segment is pointed proximally, whereupon said sliding annular member can be slid such that said sliding annular member is positioned around said hook segment for safe storage, preventing said hook point from pivoting away from said shank.

2. A fishing hook apparatus, comprising:

a resilient shaft comprising a shank segment which is substantially rectilinear and having a shank segment proximal end and a shank segment distal end and comprising a hook segment which is substantially rectilinear and having a hook segment connected end joined to the shank segment distal end, said hook segment being extendable from said shank segment at an acute angle relative to said shank segment generally back toward said shank segment proximal end and outwardly from said shank segment and terminating in a hook point;

a line engaging structure at said shank segment proximal end for receiving and engaging a strand of fishing line;

wherein said shank segment and said hook segment are interconnected by a shank segment loop in the shank segment distal end and a hook segment loop in the hook segment connected end passing through and interlinked with said shank segment loop, and also comprising a spiraled sliding wire permanently wrapped into a first coil and a second coil in diameters to closely and slidingly fit around said shank segment, said first and second coils being interconnected by a length of said wire; a third coil distal of said second coil and wrapping around said shank segment with a sufficient clearance to additionally receive said hook segment; a hook segment locking segment extending beyond said hook segment loop and pivotable into a position parallel with and adjacent to said shank segment; wherein said hook segment is pivotable to a position adjacent to said shank segment such that said sliding wire can be slid along said shank segment until said third coil encircles said locking segment, thereby retaining said locking segment in its position adjacent to said shank segment and said hook segment is oriented in an angled, deployed fish engaging position; and wherein said sliding wire can be slid proximally along said shank segment to release said locking segment, and said hook segment then can be swung freely such that said hook segment is pointed distally to release the fish with minimal damage to the fish, and wherein said hook segment can be pivoted such that said hook segment is pointed proximally and then said sliding wire can be slid such that said third coil is positioned around said hook segment for safe storage, preventing said hook point from pivoting away from said shank.

3. A fishing hook apparatus, comprising:

a resilient shaft comprising a shank segment which is substantially rectilinear and having a shank segment proximal end and a shank segment distal end and comprising a hook segment which is substantially rectilinear and having a hook segment connected end joined to the shank segment distal end, said hook segment being extendable from said shank segment at an acute angle relative to said shank segment generally back toward said shank segment proximal end and outwardly from said shank segment and terminating in a hook point;

a line engaging structure comprising at least one shaft loop formed in said shank segment proximal end by doubling a terminal length of said shaft back along said shank segment proximal end toward the shank segment distal end and then angling away from said shank segment to freely receive a strand of fishing line between adjacent portions of said shank segment;

wherein said shank segment and said hook segment are interconnected by a shank segment loop in the shank segment distal end and a hook segment loop in the hook segment connected end passing through and interlinked with said shank segment loop, and also comprising a spiraled sliding wire permanently wrapped into a first coil and a second coil in diameters to closely and slidingly fit around said shank segment, said first and second coils being interconnected by a length of said wire; a third coil distal of said second coil and wrapping around said shank segment with a sufficient clearance to additionally receive said hook segment; a hook segment locking segment extending beyond said hook segment loop and pivotable into a position parallel with and adjacent to said shank segment; wherein said hook segment is pivotable to a position adjacent to said shank segment such that said sliding wire can be slid along said shank segment until said third coil encircles said locking segment, thereby retaining said locking segment in its position adjacent to said shank segment and said hook segment is oriented in an angled, deployed fish engaging position; and wherein said sliding wire can be slid proximally along said shank segment to release said locking segment, and said hook segment then can be swung freely such that said hook segment is pointed distally to release the fish with minimal damage to the fish, and wherein said hook segment can be pivoted such that said hook segment is pointed proximally and then said sliding wire can be slid such that said third coil is positioned around said hook segment for safe storage, preventing said hook point from pivoting away from said shank.

* * * * *